(12) United States Patent
Kamachi et al.

(10) Patent No.: US 11,658,319 B2
(45) Date of Patent: May 23, 2023

(54) METHOD OF OPERATING FUEL CELL SYSTEM

(71) Applicant: HONDA MOTOR CO., LTD., Tokyo (JP)

(72) Inventors: Atsushi Kamachi, Wako (JP); Akane Goto, Wako (JP); Ryo Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/667,116

(22) Filed: Feb. 8, 2022

(65) Prior Publication Data

US 2022/0271312 A1 Aug. 25, 2022

(30) Foreign Application Priority Data

Feb. 25, 2021 (JP) .............................. JP2021-028586

(51) Int. Cl.
*H01M 8/04746* (2016.01)
*H01M 8/04537* (2016.01)
*H01M 8/0438* (2016.01)

(52) U.S. Cl.
CPC ... *H01M 8/04753* (2013.01); *H01M 8/04559* (2013.01); *H01M 8/04619* (2013.01); *H01M 2250/20* (2013.01)

(58) Field of Classification Search
CPC ......... H01M 8/04753; H01M 8/04559; H01M 8/04619; H01M 2250/20; H01M 8/04388; H01M 8/04544; Y02E 60/50
USPC ......................................................... 429/432
See application file for complete search history.

(56) References Cited

U.S. PATENT DOCUMENTS

| | | | |
|---|---|---|---|
| 8,470,486 B2 | 6/2013 | Sato et al. | |
| 2004/0185319 A1* | 9/2004 | Enjoji | H02J 1/10 |
| | | | 429/432 |
| 2005/0037248 A1* | 2/2005 | Sudo | H01M 8/2455 |
| | | | 429/448 |
| 2007/0269709 A1* | 11/2007 | Mitsuta | H01M 8/023 |
| | | | 429/492 |
| 2008/0187790 A1* | 8/2008 | Kamihara | H01M 8/04753 |
| | | | 429/513 |
| 2008/0311449 A1* | 12/2008 | Kaito | H01M 8/04753 |
| | | | 73/335.03 |
| 2009/0029213 A1* | 1/2009 | Murakami | H01M 8/043 |
| | | | 429/421 |

(Continued)

FOREIGN PATENT DOCUMENTS

| | | |
|---|---|---|
| JP | 2006-156059 A | 6/2006 |
| JP | 2006-236862 A | 9/2006 |

(Continued)

*Primary Examiner* — Christian Roldan
(74) *Attorney, Agent, or Firm* — Carrier Shende & Associates, P.C.; Joseph P. Carrier; Jeffrey T. Gedeon

(57) ABSTRACT

In a method of operating a fuel cell system, a stable-period voltage difference is calculated in a state where output power of the fuel cell stack is stable. Thereafter, a voltage difference is calculated during power generation. Then, it is determined whether or not the change amount of the voltage difference with respect to the stable-period voltage difference has exceeded a predetermined threshold value. When it is determined that the change amount has exceeded the predetermined threshold value, electric power is generated with the supply amount of the anode gas to the fuel cell stack being increased.

6 Claims, 5 Drawing Sheets

(56) References Cited

U.S. PATENT DOCUMENTS

2009/0197155 A1* 8/2009 Ganapathy ........ H01M 8/04552
429/90
2009/0325006 A1* 12/2009 Yagi .................... H01M 8/1011
429/431

FOREIGN PATENT DOCUMENTS

| JP | 2006-351336 A | 12/2006 |
| JP | 2009-158371 A | 7/2009 |
| JP | 2013-258111 A | 12/2013 |
| JP | 2016-096019 A | 5/2016 |
| JP | 2017-195132 A | 10/2017 |

* cited by examiner

METHOD OF OPERATING FUEL CELL SYSTEM

CROSS-REFERENCE TO RELATED APPLICATIONS

This application is based upon and claims the benefit of priority from Japanese Patent Application No. 2021-028586 filed on Feb. 25, 2021, the contents of which are incorporated herein by reference.

BACKGROUND OF THE INVENTION

Field of the Invention

The present invention relates to a method of operating a fuel cell system including a fuel cell stack that generates power based on supply of anode and cathode gases.

Description of the Related Art

In power generation of a fuel cell stack formed by stacking a plurality of power generation cells, there are cases where supply of an anode gas (fuel gas) to some power generation cells may be insufficient. In particular, liquid water (produced water) tends to accumulate in the vicinity of the anode discharge passage through which the anode off-gas is discharged. This tends to cause localized insufficiency of the anode gas. Such localized insufficiency of anode gas causes deterioration of the fuel cell stack.

JP 2006-351336 A discloses a fuel cell system for monitoring the cell voltage of each power generation cell. In this fuel cell system, when variation in cell voltage is large, it is determined that a supply shortage of anode gas has occurred in some power generation cells. This fuel cell system performs control to increase the rotational speed of a circulation pump of an anode system apparatus when it is determined that a supply shortage of anode gas has occurred in some power generation cells.

SUMMARY OF THE INVENTION

However, there are cases where the cell voltage of each power generation cell varies even at normal times when there is no shortage of supply of anode gas. Therefore, even if it is determined that a local supply shortage has occurred simply based on variation in cell voltage, there is also a case where a local supply shortage actually is not occurring. That is, the conventional fuel cell system has a problem where it is difficult to accurately detect a local lack of anode gas.

An object of the present invention is to solve the aforementioned problem.

In order to achieve the above object, according to an aspect of the present invention, there is provided a method of operating a fuel cell system including a fuel cell stack including a plurality of power generation cells stacked together, the power generation cells being configured to generate power based on supply of an anode gas and a cathode gas, the method including: a stable-period voltage difference calculation step of, in a state where output power of the fuel cell stack is stable, calculating a stable-period voltage difference obtained by subtracting a minimum cell voltage among cell voltages of the plurality of power generation cells from an average cell voltage obtained by averaging the cell voltages of the plurality of power generation cells; a voltage difference calculation step of, during power generation of the fuel cell stack after the stable-period voltage difference calculation step, calculating a voltage difference obtained by subtracting a minimum cell voltage among cell voltages of the plurality of power generation cells from an average cell voltage obtained by averaging the cell voltages of the plurality of power generation cells; a determination step of calculating a change amount of the voltage difference with respect to the stable-period voltage difference, and determining whether or not the change amount has exceeded a predetermined threshold value; a continuous power generation step of generating power without changing a supply amount of the anode gas to the fuel cell stack if it is determined that the change amount is equal to or less than the predetermined threshold value; and an increased-anode-gas power generation step of generating power by increasing the supply amount of the anode gas to the fuel cell stack so as to be larger than the supply amount of the anode gas of the continuous power generation step if it is determined that the change amount has exceeded the predetermined threshold value.

The method of operating the fuel cell system described above can more accurately detect local shortage of anode gas by a simple configuration. Thus, deterioration of the fuel cell stack can be satisfactorily suppressed.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
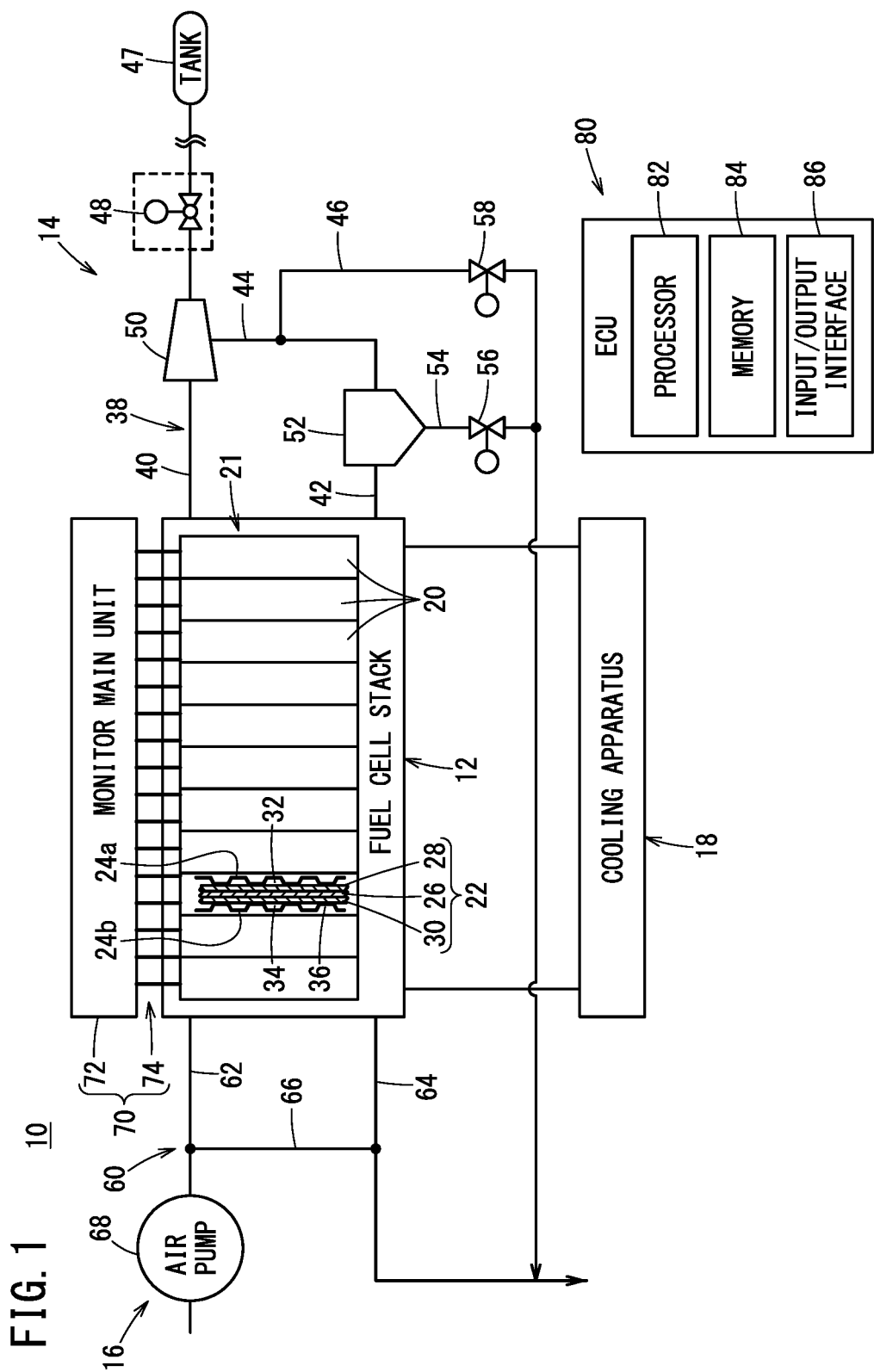
FIG. 1 is an explanatory view schematically showing an overall configuration of a fuel cell system according to an embodiment of the present invention.

As shown in FIG. 1, a fuel cell system 10 according to an embodiment of the present invention includes a fuel cell stack 12, an anode system apparatus 14, a cathode system apparatus 16, and a cooling apparatus 18. The fuel cell system 10 is mounted on a moving body (not shown) such as a fuel cell vehicle. The fuel cell system 10 supplies electric power generated by the fuel cell stack 12 to a battery of a moving body, a travel motor, or the like. The moving body on which the fuel cell system 10 is mounted is not limited to a fuel cell vehicle, but may be another type of vehicle, a ship, an aircraft, a robot, or the like. Further, the fuel cell system 10 may be configured as a stationary system instead of being mounted on a moving body.

In the fuel cell stack 12, a stack body 21 in which a plurality of power generation cells 20 are stacked is housed in a stack case (not shown). Each power generation cell 20 generates power by an electrochemical reaction between an anode gas (fuel gas such as hydrogen) and a cathode gas (oxygen-containing gas such as air).

Figure 2:
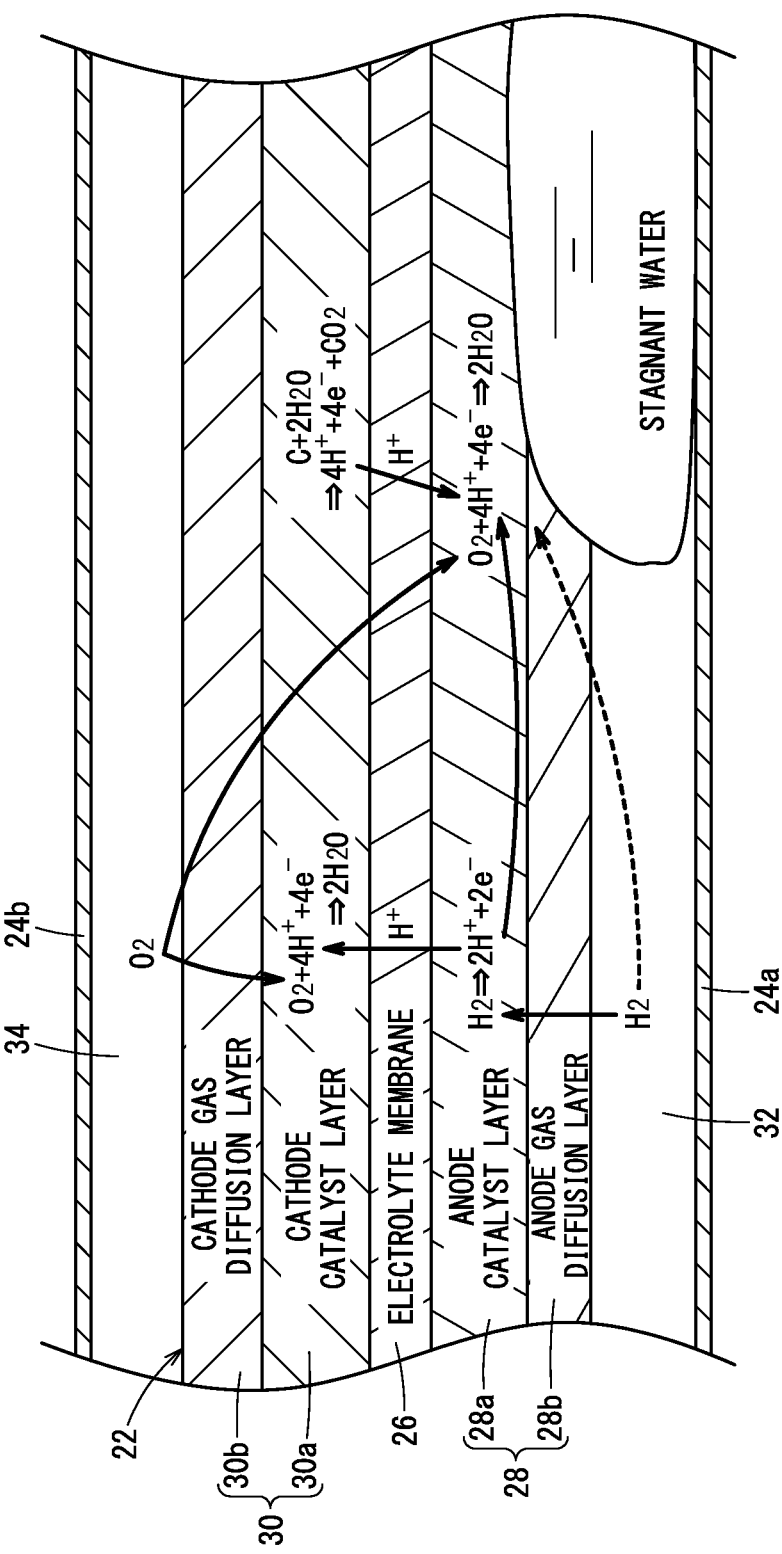
FIG. 2 is an explanatory diagram showing a chemical reaction caused by local shortage of anode gas in a power generation cell.

Each power generation cell 20 is composed of a membrane electrode assembly 22 (hereinafter referred to as "MEA 22") and a pair of separators 24a, 24b sandwiching the MEA 22. The MEA 22 includes an electrolyte membrane 26, an anode 28 provided on one surface of the electrolyte membrane 26, and a cathode 30 provided on the other surface of the electrolyte membrane 26. The electrolyte membrane 26 is, for example, a solid polymer electrolyte membrane (cation exchange membrane). As shown in FIG. 2, the anode 28 is formed by laminating an anode catalyst layer 28a and an anode gas diffusion layer 28b on one surface of the electrolyte membrane 26. The cathode 30 is formed by laminating a cathode catalyst layer 30a and a cathode gas diffusion layer 30b on the other surface of the electrolyte membrane 26.

As shown in FIGS. 1 and 2, the separator 24a forms an anode gas flow field 32 through which the anode gas flows on one surface of the MEA 22. The separator 24b forms a cathode gas flow field 34 through which the cathode gas flows on the other surface of the MEA 22. A coolant flow field 36 through which a coolant flows is formed between the surfaces of the separators 24a and 24b facing each other, by stacking the plurality of power generation cells 20.

Further, each power generation cell 20 includes a plurality of passages (an anode gas passage, a cathode gas passage, and a coolant passage) (not shown) through which the anode gas, the cathode gas, and the coolant flow along the stacking direction of the stack body 21, respectively. The anode gas passage communicates with the anode gas flow field 32, the cathode gas passage communicates with the cathode gas flow field 34, and the coolant passage communicates with the coolant flow field 36.

The fuel cell stack 12 is supplied with anode gas by the anode system apparatus 14. In the fuel cell stack 12, the anode gas flows through the anode gas passage (anode gas supply passage) into the anode gas flow field 32. The anode gas is used for power generation in the anode 28. Anode off-gas that has been used for power generation flows out from the anode gas flow field 32 to the anode gas passage (anode gas discharge passage) and is discharged from the fuel cell stack 12 to the anode system apparatus 14. The anode off-gas contains unreacted hydrogen.

Cathode gas is supplied to the fuel cell stack 12 by the cathode system apparatus 16. In the fuel cell stack 12, the cathode gas flows through the cathode gas passage (cathode gas supply passage) into the cathode gas flow field 34. The cathode gas is used for power generation in the cathode 30. The cathode off-gas that has been used for power generation flows out from the cathode gas flow field 34 to the cathode gas passage (cathode gas discharge passage) and is discharged from the fuel cell stack 12 to the cathode system apparatus 16.

Further, the fuel cell stack 12 is supplied with a coolant by the cooling apparatus 18. In the fuel cell stack 12, coolant flows through the coolant passage (coolant supply passage) into the coolant flow field 36. The coolant cools the power generation cells 20. The coolant that has cooled the power generation cells 20 flows out from the coolant flow field 36 to the coolant passage (coolant discharge passage) and is discharged from the fuel cell stack 12 to the cooling apparatus 18.

The anode system apparatus 14 of the fuel cell system 10 has an anode path 38. The anode path 38 includes an anode supply path 40 that supplies anode gas to the fuel cell stack 12 and an anode discharge path 42 that discharges anode off-gas from the fuel cell stack 12. The anode path 38 has an anode circulation path 44 for returning unreacted hydrogen contained in the anode off-gas of the anode discharge path 42 to the anode supply path 40. A purge path 46 for discharging the anode off-gas from the anode path 38 is connected to the anode circulation path 44.

A tank 47 that stores anode gas is provided upstream of the anode supply path 40. Further, in the anode supply path 40, an injector 48 and an ejector 50 are provided in this order toward the downstream side in the flow direction of the anode gas. The injector 48 is opened and closed during the operation of the fuel cell system 10 to discharge the anode gas whose pressure has been reduced to less than the pressure on the tank 47 side, downstream. The ejector 50 supplies the anode gas discharged from the injector 48 to the fuel cell stack 12. Further, the ejector 50 suctions the anode off-gas from the anode circulation path 44 and supplies the suctioned anode off-gas to the fuel cell stack 12. The ejector 50 suctions the anode off-gas by negative pressure. The negative pressure is generated by the anode gas being discharged from the injector 48.

A gas-liquid separator 52 is provided in the anode discharge path 42. The gas-liquid separator 52 separates liquid water (water generated during power generation) contained in the anode off-gas from the anode off-gas. The anode circulation path 44 is connected to an upper portion of the gas-liquid separator 52. Thus, the anode off-gas (gas) from which the liquid water has been removed flows into the anode circulation path 44. One end of a drain path 54 for discharging separated water is connected to a bottom portion of the gas-liquid separator 52. A drain valve 56 for opening and closing the internal flow path is provided in the drain path 54. The purge path 46 is provided with a purge valve 58 for opening and closing the internal flow path.

The cathode system apparatus 16 of the fuel cell system 10 has a cathode path 60. The cathode path 60 includes a cathode supply path 62 that supplies cathode gas to the fuel cell stack 12, and a cathode discharge path 64 that discharges cathode off-gas from the fuel cell stack 12. A cathode bypass passage 66 is connected between the cathode supply path 62 and the cathode discharge path 64. As a result, the cathode gas in the cathode supply path 62 flows directly to the cathode discharge path 64 without passing through the fuel cell stack 12. A bypass valve (not shown) for adjusting the flow of the cathode gas is provided in the cathode bypass passage 66. A drain path 54 (purge path 46) of the anode system apparatus 14 is connected to the cathode discharge path 64 on the downstream side of the cathode bypass passage 66.

An air pump 68 that supplies cathode gas to the fuel cell stack 12 is provided in the cathode supply path 62. During rotation of a fan (not shown), the air pump 68 compresses air (outside air) of the upstream side of the air pump 68 and supplies the compressed air to the cathode supply path 62 on the downstream side. Further, a temperature controller for cooling the cathode gas with a coolant such as air or water and a humidifier for humidifying the cathode gas may be provided in the cathode supply path 62.

Further, the fuel cell system 10 includes a cell voltage monitor 70 and an ECU 80 (Electronic Control Unit: control device). The cell voltage monitor 70 detects a cell voltage which is an output voltage (power generation state) for each of the plurality of power generation cells 20. The ECU 80 receives a signal from the cell voltage monitor 70. The cell voltage monitor 70 includes a monitor main unit 72 mounted on the fuel cell stack 12, and a plurality of harnesses 74 for connecting the monitor main unit 72 and each power generation cell 20. The monitor main unit 72 scans each power generation cell 20 every predetermined period to detect the cell voltage. Then, the cell voltage monitor 70 transmits an average cell voltage $V_{ave}$ (see FIG. 4) obtained by averaging the cell voltages of the power generation cells 20 to the ECU 80. Further, the cell voltage monitor 70 transmits the minimum cell voltage $V_{min}$ (see FIG. 4) that is the lowest among the cell voltages of the power generation cells 20 to the ECU 80.

The ECU 80 includes one or more processors 82, one or more memories 84, one or more input/output interfaces 86, and one or more electronic circuits (not shown). When one or more processors 82 execute a program (not shown) stored in the memory 84, a plurality of functional blocks for controlling each component of the fuel cell system 10 are formed in the ECU 80. At least part of each functional block may be constituted by an electronic circuit including an integrated circuit such as an ASIC (Application Specific Integrated Circuit) or an FPGA (Field-Programmable Gate Array) or discrete devices. The memory 84 may also be attached to the processor 82, the integrated circuit, or the like.

Here, the ECU 80 according to the present embodiment performs power generation of the fuel cell stack 12. Further, during power generation of the fuel cell stack 12, the ECU 80 performs control for eliminating shortage of anode gas by detecting a local shortage of anode gas in the plurality of power generation cells 20. As a result, performance deterioration of the fuel cell stack 12 can be suppressed. Hereinafter, in order to facilitate understanding of the present invention, the operation of the power generation cell 20 that occurs when the anode gas is deficient will be described.

As shown in FIG. 2, in the anode 28 and the cathode 30 of the power generation cell 20, the following reaction proceeds in a normal power generation state.

Anode: $H_2 \rightarrow 2H^+ + 2e^-$

Cathode: $O_2 + 4H^+ + 4e^- \rightarrow 2H_2O$

On the other hand, the supply shortage of the anode gas in the anode 28 occurs due to stagnant water accumulating near an end portion (anode gas discharge passage) of the fuel cell stack 12. The stagnant water is liquid water in which produced water generated by power generation at the cathode 30 has moved to the anode side through the electrolyte membrane 26. In the anode gas deficient region of the anode 28, the following reaction is caused by oxygen transmitted from the cathode 30, resulting in the raised potential on the anode side. In response to this, the potential on the cathode side increases, so that the following reaction occurs in the cathode 30.

Anode: $O_2 + 4H^+ + 4e^- \rightarrow 2H_2O$

Cathode: $2H_2O \rightarrow O_2 + 4H^+ + 4e^-$ $C + 2H_2O \rightarrow 4H^+ + 4e^- + CO_2$ That is, in the cathode 30, platinum contained in the cathode catalyst layer 30a becomes easily eluted into ionomer due to the generation of a local high potential associated with the stagnant water of the anode 28, and the oxidation reaction of carbon proceeds. As a result, in the fuel cell stack 12, the above situation causes the catalyst particles to fall off and the pores in the electrode to collapse, leading to performance deterioration of the power generation cell 20.

Figure 3:
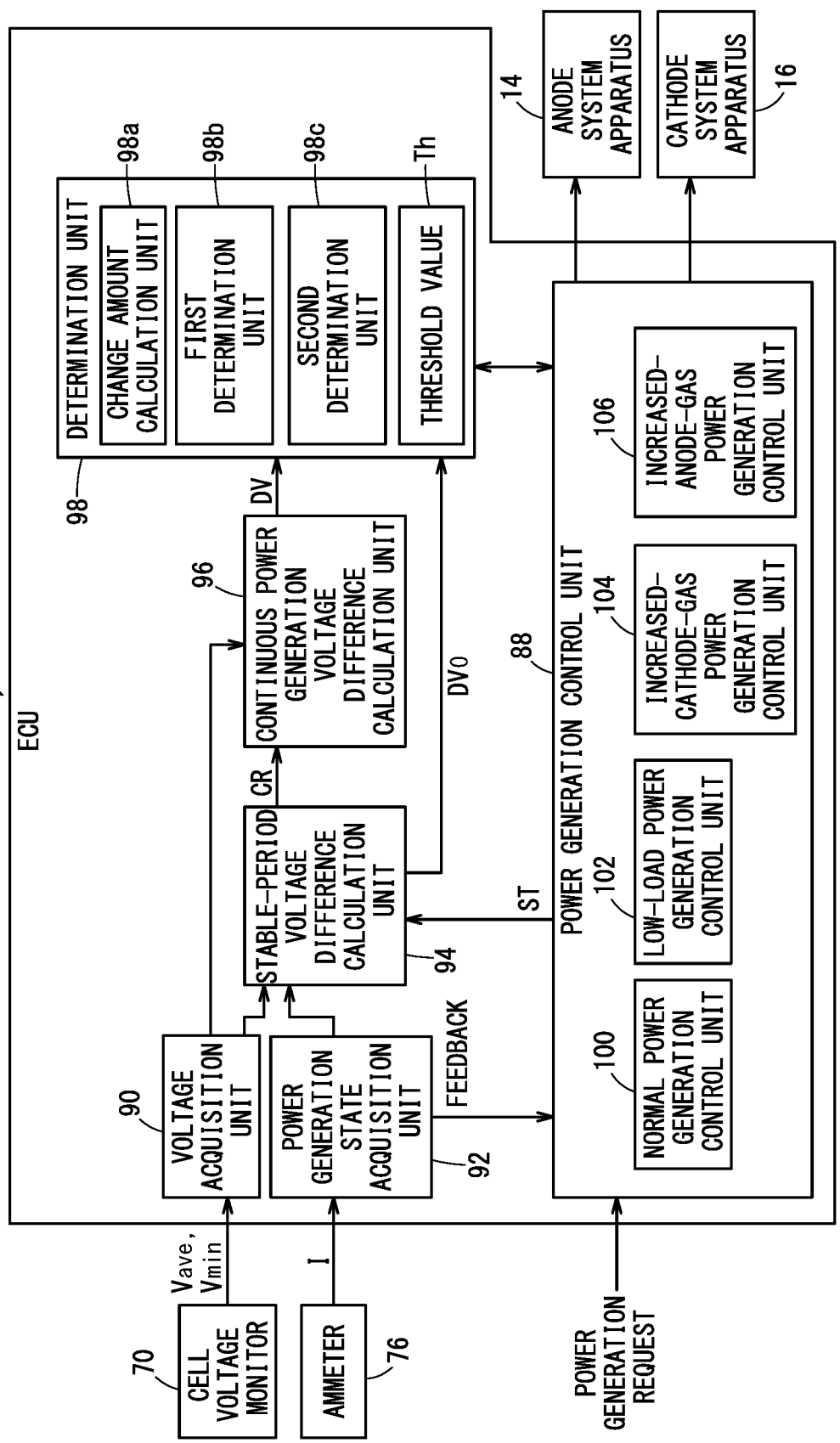
FIG. 3 is a block diagram showing functional blocks of an ECU.

In particular, in the fuel cell system 10, if the supply amount of the anode gas to the fuel cell stack 12 is small, the drainability to the anode discharge path 42 is reduced. This tends to cause localized insufficiency of the anode gas. As such, the ECU 80 performs a process for detecting and eliminating a local shortage of anode gas in a situation where the supply amount of anode gas is small. Specifically, as shown in FIG. 3, the ECU 80 includes a power generation control unit 88, a voltage acquisition unit 90, a power generation state acquisition unit 92, a stable-period voltage difference calculation unit 94, a continuous power generation voltage difference calculation unit 96, and a determination unit 98.

The power generation control unit 88 controls each component of the fuel cell system 10 to control power generation in the fuel cell stack 12. In order to switch the control (control contents) in accordance with the traveling state of the moving body and the state of the fuel cell stack 12, the power generation control unit 88 includes a normal power generation control unit 100, a low-load power generation control unit 102, an increased-cathode-gas power generation control unit 104, and an increased-anode-gas power generation control unit 106.

For example, during normal running of the moving body, the normal power generation control unit 100 of the power generation control unit 88 performs normal power generation. In normal power generation, the normal power generation control unit 100 calculates a supply amount of anode gas (hereinafter referred to as a normal anode gas amount) based on a power generation request from a traveling ECU or the like. The normal power generation control unit 100 operates the injector 48 and the like of the anode system apparatus 14 in accordance with the control content corresponding to the normal anode gas amount. Further, the normal power generation control unit 100 calculates a supply amount of cathode gas (hereinafter referred to as a normal cathode gas amount) based on the power generation request. The normal power generation control unit 100 operates the air pump 68 and the like of the cathode system apparatus 16 according to the control content corresponding to the normal cathode gas amount.

Further, there are cases where the user of the moving body may perform low-load running in which a low load is applied to the travel motor, for example, by loosening the accelerator. In these cases, the low-load power generation control unit 102 of the power generation control unit 88 performs low-load power generation. Since the power generation demand becomes low, the low-load power generation control unit 102 operates the injector 48 so that the supply amount becomes small (hereinafter referred to as a low-load anode gas amount). The small supply amount means a supply amount smaller than the normal anode gas amount of the anode gas in the normal power generation. Further, the low-load power generation control unit 102 operates the air pump 68 so as to provide a small supply amount (hereinafter referred to as a low-load cathode gas amount). The small supply amount is a supply amount smaller than the normal cathode gas amount of the cathode gas during normal power generation.

As described above, a local shortage of the anode gas occurs when the supply amount of the anode gas is small (i.e., when the low-load anode gas amount is supplied). Therefore, the ECU 80 estimates a local shortage of anode gas based on the cell voltages of the plurality of power generation cells 20, at the time of low-load power generation. Then, the increased-cathode-gas power generation control unit 104 and the increased-anode-gas power generation control unit 106 operate when a local shortage of anode gas is estimated. Execution of this process is not limited to the case of low-load power generation. For example, this process may be performed at the time of idle power generation in which power is generated so that operation of the fuel cell system 10 is not stopped even if the power generation request is 0. Further, this process may be performed at the time of stoppage-period power generation in which power generation is performed during stoppage of operating of the moving body for the purpose of charging the battery or preventing freezing.

During power generation in the fuel cell stack 12, the voltage acquisition unit 90 periodically acquires the average cell voltage $V_{ave}$ and the minimum cell voltage $V_{min}$ of the plurality of power generation cells 20 from the cell voltage monitor 70, and stores them in the memory 84. Alternatively, the voltage acquisition unit 90 acquires the cell voltages of the plurality of power generation cells 20 from the cell voltage monitor 70. Then, the average cell voltage $V_{ave}$ and the minimum cell voltage $V_{min}$ may be calculated in the ECU 80 from the acquired cell voltages. Alternatively, the voltage acquisition unit 90 acquires an output voltage from a voltmeter (not shown) for detecting the output voltage (total voltage) of the entire fuel cell stack 12. Then, the voltage acquisition unit 90 may calculate the average cell voltage $V_{ave}$ by dividing the output voltage by the number of the power generation cells 20.

The power generation state acquisition unit 92 monitors the power generation state (output power or output current I) of the fuel cell stack 12. For example, the ECU 80 is connected to an ammeter 76 provided near the output terminal of the fuel cell stack 12. Then, the power generation state acquisition unit 92 acquires a detection signal (output current I) of the ammeter 76, and stores it in the memory 84. By feeding back the output current I acquired by the power generation state acquisition unit 92, the power generation control unit 88 adjusts the supply amounts of the anode gas and the cathode gas.

Figure 4:
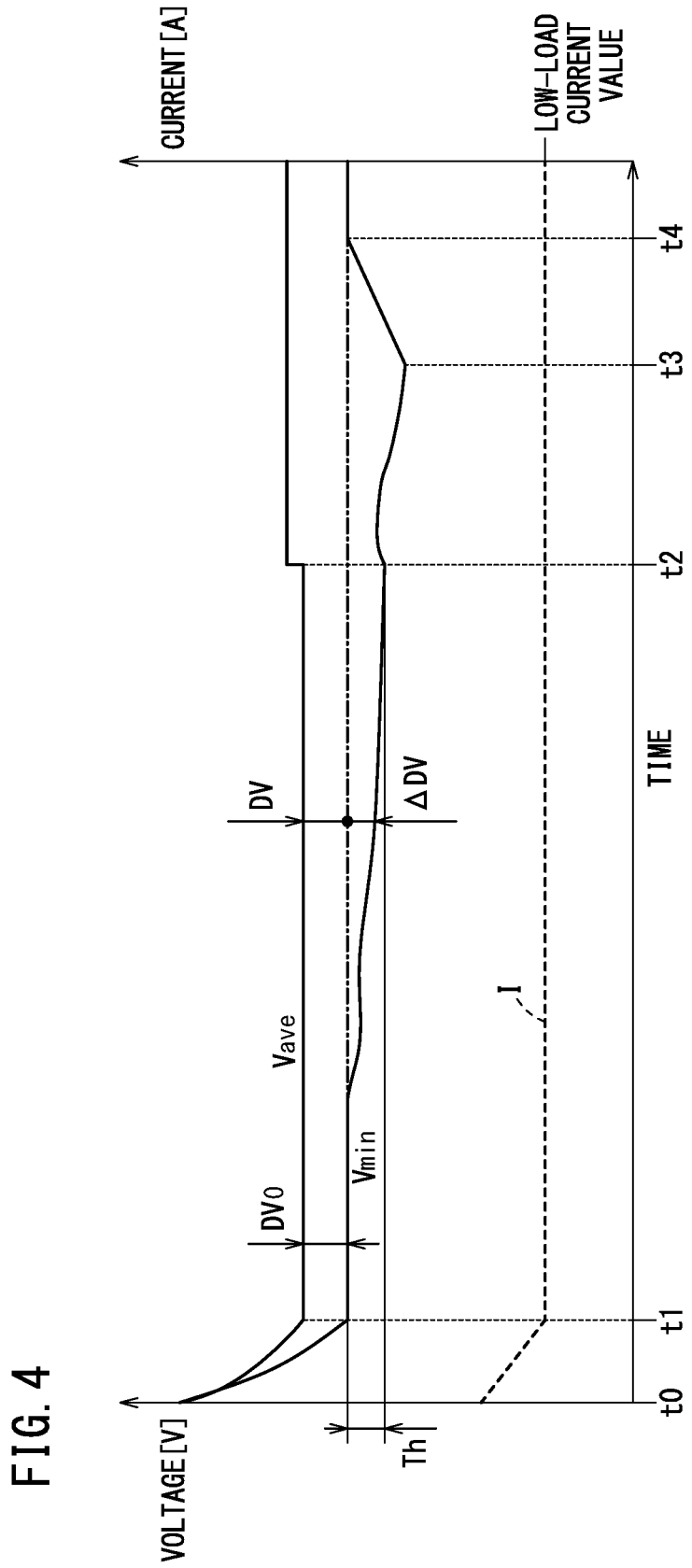
FIG. 4 is a graph illustrating changes in output current, average cell voltage, and minimum cell voltage at the time of low-load power generation.

The stable-period voltage difference calculation unit 94 calculates a stable-period voltage difference $DV_0$ at the timing when the output current I (output power) of the fuel cell stack 12 has become stable. This timing occurs after the supply amount of the anode gas has become small, that is, after the start of low-load power generation. Specifically, when receiving the operation start information ST of the low-load power generation control unit 102, the stable-period voltage difference calculation unit 94 monitors the output current I acquired by the power generation state acquisition unit 92. As shown in FIG. 4, after the start of low-load power generation, the output current I of the fuel cell stack 12 gradually changes from a value corresponding to the previous power generation state to a value corresponding to the low-load power generation (low-load current value). Thereafter, the output current I remains substantially constant. The stable-period voltage difference calculation unit 94 judges whether or not the output current I has become constant. Then, at time t1 when the output current I has become constant, the stable-period voltage difference calculation unit 94 obtains the stable-period voltage difference $DV_0$ by subtracting the minimum cell voltage $V_{min}$ from the average cell voltage $V_{ave}$ acquired by the voltage acquisition unit 90.

That is, immediately after the start of the low-load power generation, since the low-load power generation has not been carried out before, there is no stagnant water accumulating near the anode gas discharge passage at the end portion of the fuel cell stack 12. Therefore, the fuel cell stack 12 immediately after the start of low-load power generation can generate power in a state in which the anode gas is supplied to the entire plurality of power generation cells 20. Therefore, the stable-period voltage difference $DV_0$ indicates a variation in cell voltage of the power generation cells 20 in a state where there is no local deficiency of the anode gas occurring.

The cell voltage of each power generation cell 20 increases or decreases in a short period of time, depending on the power generation state. Therefore, it is preferable that the stable-period voltage difference calculation unit 94 and the continuous power generation voltage difference calculation unit 96 described later calculate an average value for a certain period (for example, one minute).

Returning to FIG. 3, the continuous power generation voltage difference calculation unit 96 operates by receiving the operation command CR after the stable-period voltage difference $DV_0$ is calculated by the stable-period voltage difference calculation unit 94. Then, the continuous power generation voltage difference calculation unit 96 calculates the voltage difference DV in the low-load power generation, and stores the calculated voltage difference DV in the memory 84. The voltage difference DV is also calculated in the same manner as the above-described stable-period voltage difference $DV_0$. That is, the voltage difference DV is calculated by subtracting the average cell voltage $V_{ave}$ and the minimum cell voltage $V_{min}$, which are acquired every predetermined period by the voltage acquisition unit 90.

Here, when the low-load power generation is continued, the stagnant water accumulates near the anode gas discharge passage at the end portion of the fuel cell stack 12. When the amount of stagnant water increases, a local deficiency of anode gas occurs in the power generation cell 20 near the end portion (see also FIG. 2). As described above, the local deficiency of the anode gas increases the potentials of the anode 28 and the cathode 30. However, the cell voltage becomes small. The cell voltage is a potential difference between the anode 28 and the cathode 30. As a result, the voltage difference DV obtained by subtracting the minimum cell voltage $V_{min}$ from the average cell voltage $V_{ave}$ becomes large.

Therefore, the determination unit 98 calculates a change amount $\Delta DV$ which is a degree of change of the voltage difference DV with respect to the stable-period voltage difference $DV_0$ in a state where water is not accumulated. Then, the change amount $\Delta DV$ is monitored by comparing the change amount $\Delta DV$ with a predetermined threshold value Th stored in advance. This is because, if the change amount $\Delta DV$ increases, it can be estimated that the stagnant water is accumulated in the power generation cell 20 near the end portion. The threshold value Th is set to an appropriate value in advance by experiments or the like. The threshold value Th may be a fixed value or a variable value. For example, it is preferable that the threshold value Th is set in a range of about ½ to 3 times the stable-period voltage difference $DV_0$.

However, in a state in which water is accumulated in the power generation cell 20, since a large amount of water also exists in the cathode 30, there are cases where flooding may occur in the cathode 30. Also in this case, the change amount $\Delta DV$ becomes large. However, this flooding has little effect on the performance degradation of the fuel cell stack 12. Therefore, after the ECU 80 first determines that the change amount $\Delta DV$ has exceeded the threshold value Th, the ECU 80 increases the amount of the cathode gas to eliminate the flooding of the cathode 30. If the change amount $\Delta DV$ is still in excess of the threshold value Th, it is judged that the anode gas is locally deficient.

Therefore, the determination unit 98 includes therein a change amount calculation unit 98a, a first determination unit 98b, and a second determination unit 98c. The power generation control unit 88 includes an increased-cathode-gas power generation control unit 104 and an increased-anode-gas power generation control unit 106. The change amount calculation unit 98a calculates a change amount ΔDV by subtracting the stable-period voltage difference $DV_0$ from the voltage difference DV, and stores the calculated change amount ΔDV in the memory 84.

The first determination unit 98b first performs a determination step of determining whether or not the change amount ΔDV has exceeded the threshold value Th. When the determination step determines that the change amount ΔDV has exceeded the threshold value Th (time t2 in FIG. 4), the power generation control unit 88 starts the increased-cathode-gas power generation control by the increased-cathode-gas power generation control unit 104.

At this time, the increased-cathode-gas power generation control unit 104 controls the air pump 68. Then, the supply amount of the cathode gas to the fuel cell stack 12 (hereinafter referred to as "increase cathode gas amount") is made larger than the low-load cathode gas amount at the time of low-load power generation. For example, it is preferable that the increased cathode gas amount is adjusted to be twice or more the low-load cathode gas amount. On the other hand, the increased-cathode-gas power generation control unit 104 maintains the supply amount of the anode gas at the low-load anode gas amount for the low-load power generation. Therefore, as shown in the interval between time t2 and time t3 in FIG. 4, the power generation voltage of the fuel cell stack 12 slightly increases. Then, the target voltage at the time of low-load power generation can be substantially maintained.

The second determination unit 98c performs a re-determination step of determining whether or not the change amount ΔDV has exceeded the threshold value Th. This operation is performed at a timing (time t3 in FIG. 4) when a predetermined period of time has elapsed from the start of operation of the increased-cathode-gas power generation control unit 104. Also in the re-determination step, power generation control by the increased-cathode-gas power generation control unit 104 continues. Here, when the change amount ΔDV has decreased to a value equal to or less than the threshold value Th, it can be considered that flooding of the cathode 30 caused an unstable power generation. Conversely, when the change amount ΔDV remains in excess of the threshold value Th, it can be determined that a local deficiency of the anode gas is occurring. In the re-determination step, when the change amount ΔDV is in excess of the threshold value Th, the power generation control unit 88 starts the increased-anode-gas power generation control by the increased-anode-gas power generation control unit 106.

At this time, the increased-anode-gas power generation control unit 106 controls the injector 48 so that the supply amount of the anode gas (hereinafter referred to as the increase anode gas amount) is larger than the low-load anode gas amount for the low-load power generation. Further, the increased-anode-gas power generation control unit 106 maintains the supply amount of the cathode gas at the low-load cathode gas amount for the low-load power generation. Thus, since the increased amount of the anode gas is supplied, the stagnant water accumulated by the anode 28 is forced to flow out, so that the local deficiency of the anode gas can be eliminated.

The increased-anode-gas power generation control unit 106 preferably increases the amount of the anode gas. Further, it is preferable that the increased-anode-gas power generation control unit 106 lengthen the valve opening period of the drain valve 56 of the drain path 54 or the valve opening period of the purge valve 58 of the purge path 46. As a result, the purge amount of the anode gas increases, and water can be more easily discharged from the fuel cell stack 12.

The fuel cell system 10 according to the present embodiment is basically constructed as described above, and its operation will be described below.

The fuel cell system 10 is normally controlled by the normal power generation control unit 100 of the ECU 80. The normal power generation control unit 100 operates the anode system apparatus 14 to supply anode gas to the fuel cell stack 12. Further, the normal power generation control unit 100 operates the cathode system apparatus 16 to supply cathode gas to the fuel cell stack 12. As a result, the fuel cell stack 12 generates power, and the generated power is supplied to the travel motor, the battery, and the like.

Further, the ECU 80 continuously acquires the average cell voltage $V_{ave}$ and the minimum cell voltage $V_{min}$ of the power generation cells 20 of the fuel cell stack 12 by the voltage acquisition unit 90. Further, the ECU 80 continuously acquires the output current I of the fuel cell stack 12 by the power generation state acquisition unit 92.

When the demand for power generation is low, the ECU 80 controls the low-load power generation by the low-load power generation control unit 102. At this time, the low-load power generation control unit 102 supplies the fuel cell stack 12 with an anode gas having the low-load anode gas amount smaller than the normal anode gas amount for the normal power generation. Furthermore, the low-load power generation control unit 102 supplies a cathode gas having the low-load cathode gas amount, which is smaller than the normal cathode gas amount for the normal power generation, to the fuel cell stack 12. Thus, the fuel cell stack 12 outputs low-load power generation power (output current I) corresponding to the low-load anode gas amount and the low-load cathode gas amount.

Figure 5:
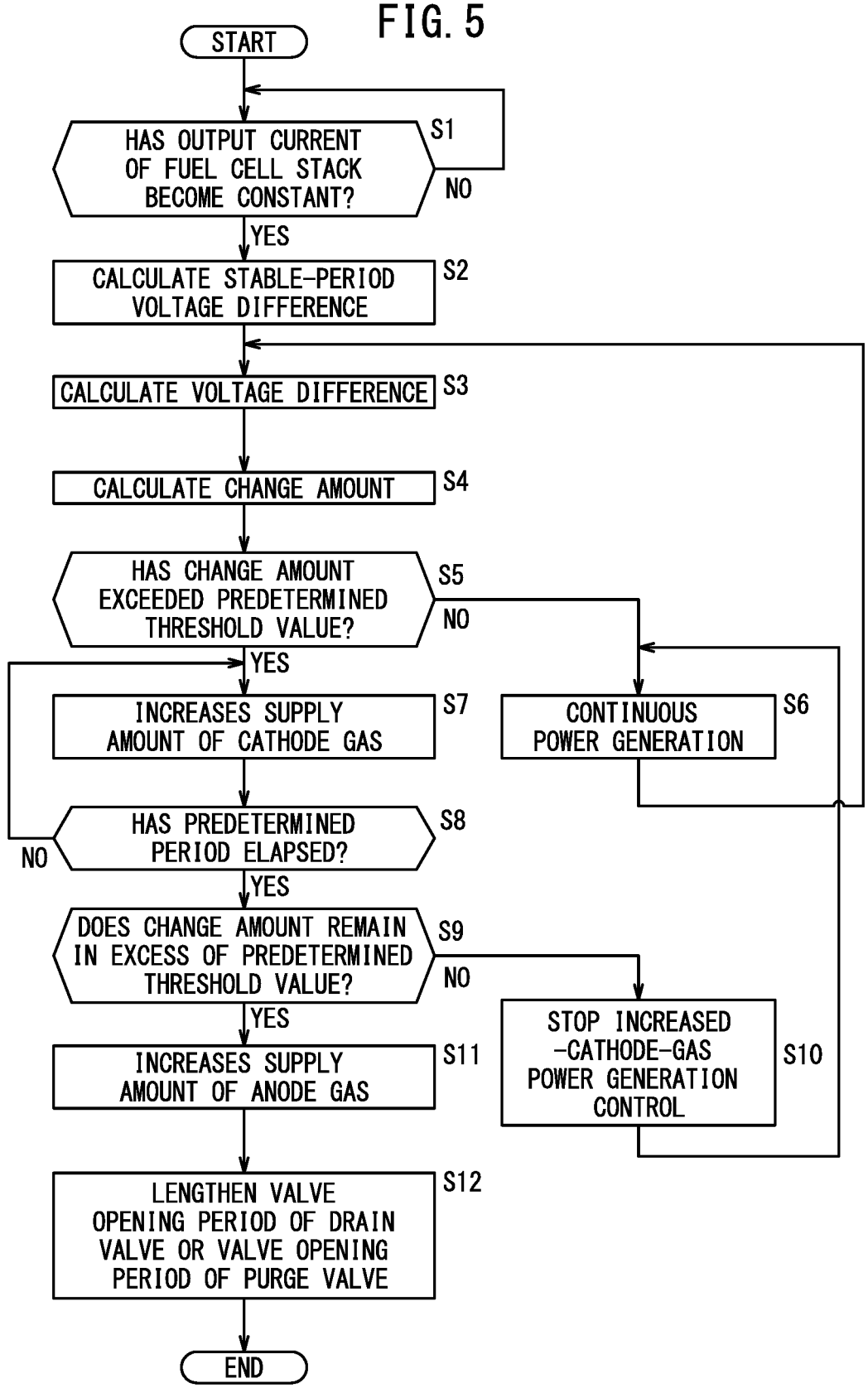
FIG. 5 is a flowchart showing a process of a method of operating the fuel cell system.

As shown in FIG. 5, in the low-load power generation, the stable-period voltage difference calculation unit 94 of the ECU 80 acquires information ST indicating the start of low-load power generation of the fuel cell stack 12. Then, it is determined whether or not the output current I of the fuel cell stack 12 has become constant at the low-load current value (step S1). When the output current I is changing (step S1: NO), the process returns to step S1. On the other hand, when the output current I has become constant (step S1: YES), the process proceeds to step S2. In FIG. 4, the output current I is constant at time t1.

Then, the stable-period voltage difference calculation unit 94 calculates the stable-period voltage difference $DV_0$ by subtracting the minimum cell voltage $V_{min}$ from the average cell voltage $V_{ave}$, and stores the stable-period voltage difference $DV_0$ in the memory 84 (step S2: stable-period voltage difference calculation step). Thereafter, during the execution of the low-load power generation, the continuous power generation voltage difference calculation unit 96 calculates the voltage difference DV by subtracting the minimum cell voltage $V_{min}$ from the average cell voltage $V_{ave}$, and stores the calculated voltage difference DV in the memory 84 (step S3: voltage difference calculation step).

Then, the change amount calculation unit 98a of the determination unit 98 calculates the change amount ΔDV by subtracting the voltage difference DV from the stable-period voltage difference $DV_0$ (step S4). The determination unit 98 (first determination unit 98b) first determines whether or not the change amount ΔDV has exceeded a predetermined threshold value Th (step S5: determination step). If the change amount ΔDV is equal to or smaller than the threshold value Th (step S5: NO), the process proceeds to step S6. The ECU 80 does not change the supply amounts of the anode gas and the cathode gas to the fuel cell stack 12. That is, the ECU 80 performs continuous power generation for generating power while maintaining the low-load anode gas amount and the low-load cathode gas amount (step S6: continuous power generation step). After step S6, the process returns to step S3, and the same processing flow is repeated.

On the other hand, if the change amount ΔDV has exceeded the threshold value Th (step S5: YES), the process proceeds to step S7 (see time t2 in FIG. 4). Thereafter, the increased-cathode-gas power generation control unit 104 increases the supply amount of the cathode gas (as the increase cathode gas amount) to generate power in the fuel cell stack 12 (step S7: increased-cathode-gas power generation step).

After the start of control by the increased-cathode-gas power generation control unit 104, the determination unit 98 determines whether a predetermined period has elapsed (step S8). When the predetermined period has not yet elapsed (step S8: NO), the determination unit 98 continues the step S7. On the other hand, when the predetermined period has elapsed (step S8: YES), the process proceeds to step S9. Thus, if flooding occurs in the cathode 30 of the power generation cell 20, flooding is eliminated after step S8 (at time t3 in FIG. 4).

Then, the determination unit 98 (second determination unit 98c) determines whether or not the change amount ΔDV remains in excess of the predetermined threshold value Th (step S9: re-determination step). When the amount of change ΔDV is equal to or less than the threshold value Th (step S9: NO), it is considered that the flooding occurring in the cathode 30 has been eliminated. Therefore, the ECU 80 stops the control of the increased-cathode-gas power generation control unit 104 (step S10), and switches from the increased-cathode-gas power generation step in step S7 to the continuous power generation step in step S6. Thereafter, the process returns to step S3, and the same processing flow is repeated until the low-load power generation ends.

On the other hand, when the change amount ΔDV is in excess of the threshold value Th (step S9: YES), it can be considered that a local deficiency of the anode gas occurs in the anode 28. Therefore, the ECU 80 stops the operation of the increased-cathode-gas power generation control unit 104. Then, the increased-anode-gas power generation control unit 106 increases the supply amount of the anode gas (as the increase anode gas amount) to generate power in the fuel cell stack 12 (step S11: increased-anode-gas power generation step). Further, the increased-anode-gas power generation control unit 106 lengthens the valve opening period of the drain valve 56 or the valve opening period of the purge valve 58 (Step S12). Thereby, the discharge amount of the anode gas from the anode path 38 is increased.

The ECU 80 calculates the voltage difference DV also during the increased-anode-gas power generation control (steps S11 and S12) performed by the increased-anode-gas power generation control unit 106. The ECU 80 continues to calculate the voltage difference DV until the voltage difference DV reaches the stable-period voltage difference $DV_0$ (see time t4 in FIG. 4). As a result, local deficiency of the anode gas in the anode 28 is reliably eliminated. After the voltage difference DV reaches the stable-period voltage difference $DV_0$, for example, the low-load power generation by the low-load power generation control unit 102 may be performed. Thus, the fuel cell system 10 can suppress consumption of the anode gas.

By performing the processing flow described above, in the fuel cell system 10, it is possible to accurately detect a local shortage of anode gas in the anode 28. This local shortage of anode gas is then eliminated. In other words, the fuel cell system 10 can suppress performance deterioration of the fuel cell stack 12.

The present invention is not limited to the embodiment described above, and various modifications can be made in accordance with the essence and gist of the invention. For example, in the operation method of the fuel cell system 10, when the change amount ΔDV first exceeds the predetermined threshold value Th, the increased-cathode-gas power generation control may not be performed and the increased-anode-gas power generation control may be performed immediately. Thus, even if local shortage of the anode gas does not occur in the anode 28, the stagnant water accumulated in the vicinity of the anode discharge passage can be discharged early.

For example, in the operation method of the fuel cell system 10, when the increased-anode-gas power generation control is performed, the supply amount of the cathode gas may be increased in accordance with the increase anode gas amount. As a result, electric power generated by the fuel cell stack 12 increases, and the battery can be charged with the electric power, thereby suppressing the consumption of the anode gas.

The invention and effects that can be understood from the above embodiment will be described below.

According to an aspect of the present invention, there is provided a method of operating a fuel cell system 10 including a fuel cell stack 12 including a plurality of power generation cells 20 stacked together, the power generation cells being configured to generate power based on supply of an anode gas and a cathode gas, the method including: a stable-period voltage difference calculation step of, in a state where output power of the fuel cell stack 12 is stable, calculating a stable-period voltage difference $DV_0$ obtained by subtracting a minimum cell voltage ($V_{min}$) among cell voltages of the plurality of power generation cells 20 from an average cell voltage $V_{ave}$ obtained by averaging the cell voltages of the plurality of power generation cells 20; a voltage difference calculation step of, during power generation of the fuel cell stack 12 after the stable-period voltage difference calculation step, calculating a voltage difference DV obtained by subtracting a minimum cell voltage among cell voltages of the plurality of power generation cells 20 from an average cell voltage $V_{ave}$ obtained by averaging the cell voltages of the plurality of power generation cells 20; a determination step of calculating a change amount ΔDV of the voltage difference DV with respect to the stable-period voltage difference $DV_0$, and determining whether or not the change amount ΔDV has exceeded a predetermined threshold value Th; a continuous power generation step of generating power without changing a supply amount of the anode gas to the fuel cell stack 12 if it is determined that the change amount ΔDV is equal to or less than the predetermined threshold value Th; and an increased-anode-gas power generation step of generating power by increasing the supply amount of the anode gas to the fuel cell stack 12 so as to be larger than the supply amount of the anode gas of the continuous power generation step if it is determined that the change amount ΔDV has exceeded the predetermined threshold value Th.

According to the above, in the operation method of the fuel cell system 10, by determining the change amount ΔDV of the voltage difference DV with respect to the stable-period voltage difference $DV_0$, it is possible to monitor the change of the cell voltage in which the variation of the cell voltages of the plurality of power generation cells 20 is considered in advance. This makes it possible to more accurately detect a local deficiency of anode gas that occurs during power generation of the fuel cell stack 12. When the change amount ΔDV has exceeded the threshold value Th, the anode gas is increased by the increased-anode-gas power generation step, thereby discharging the stagnant water of the anode 28. As a result, the fuel cell system 10 can eliminate the local deficiency of the anode gas at an early stage and can suppress the deterioration of the fuel cell stack 12 suitably.

Further, if the determination step determines that the change amount ΔDV has exceeded the predetermined threshold value Th, the method performs: an increased-cathode-gas power generation step of increasing a supply amount of the cathode gas to the fuel cell stack 12, prior to the increased-anode-gas power generation step; and a re-determination step of re-determining whether or not the change amount ΔDV remains in excess of the predetermined threshold value Th after the increased-cathode-gas power generation step; if it is determined in the re-determination step that the change amount ΔDV is equal to or less than the predetermined threshold value Th, the increased-cathode-gas power generation step is stopped and the continuous power generation step is performed; and if it is determined in the re-determination step that the change amount ΔDV remains in excess of the predetermined threshold value Th, the increased-anode-gas power generation step is performed. With the increased-cathode-gas power generation step, the fuel cell system 10 can eliminate the influence of the flooding of the cathode 30, and can more accurately detect the local deficiency of anode gas.

After the increased-cathode-gas power generation step is performed for a predetermined period of time, the re-determination step is performed. Thus, the fuel cell system 10 can more reliably eliminate the flooding of the cathode 30.

When the increased-anode-gas power generation step is carried out, the increased-cathode-gas power generation step is stopped. As a result, the fuel cell system 10 can suppress an increase in generated power of the fuel cell stack 12 when the increased-anode-gas power generation step is performed. Therefore, it is possible to avoid waste such as, for example, waste of electric power generated by the fuel cell stack 12.

Further, in the increased-anode-gas power generation step, the valve opening period for one or more valves (the drain valve 56 and the purge valve 58) provided in the path through which the anode off-gas discharged from the fuel cell stack 12 flows is lengthened. As a result, the fuel cell system 10 can further enhance the drainage performance of the stagnant water from the fuel cell stack 12 in the increased-anode-gas power generation step.

Further, the increased-anode-gas power generation step continues until the voltage difference DV reaches the stable-period voltage difference $DV_0$. This makes it possible for the fuel cell system 10 to more reliably eliminate local deficiency of anode gas.

Furthermore, by supplying a low-load anode gas amount and a low-load cathode gas amount, a low-load power generation that generates power lower than power generated in a normal power generation of the fuel cell stack 12 can be performed, the low-load anode gas amount being lower than the supply amount of the anode gas in the normal power generation, the low-load cathode gas amount being lower than a supply amount of the cathode gas in the normal power generation, and when the low-load power generation is performed, the stable-period voltage difference calculation step, the voltage difference calculation step, the determination step, the continuous power generation step, or the increased-anode-gas power generation step is performed. As a result, the fuel cell system 10 can appropriately cope with a local shortage of anode gas which is likely to occur at the time of low-load power generation.

What is claimed is:

1. A method of operating a fuel cell system comprising a fuel cell stack including a plurality of power generation cells stacked together, the power generation cells being configured to generate power based on supply of an anode gas and a cathode gas, the method comprising:

a stable-period voltage difference calculation step of, in a state where output power of the fuel cell stack is stable, calculating a stable-period voltage difference obtained by subtracting a minimum cell voltage among cell voltages of the plurality of power generation cells from an average cell voltage obtained by averaging the cell voltages of the plurality of power generation cells;

a voltage difference calculation step of, during power generation of the fuel cell stack after the stable-period voltage difference calculation step, calculating a voltage difference obtained by subtracting a minimum cell voltage among cell voltages of the plurality of power generation cells from an average cell voltage obtained by averaging the cell voltages of the plurality of power generation cells;

a determination step of calculating a change amount of the voltage difference with respect to the stable-period voltage difference, and determining whether or not the change amount has exceeded a predetermined threshold value;

a continuous power generation step of generating power without changing a supply amount of the anode gas to the fuel cell stack if it is determined that the change amount is equal to or less than the predetermined threshold value;

an increased-anode-gas power generation step of generating power by increasing the supply amount of the anode gas to the fuel cell stack so as to be larger than the supply amount of the anode gas of the continuous power generation step if it is determined that the change amount has exceeded the predetermined threshold value;

an increased-cathode-gas power generation step of increasing a supply amount of the cathode gas to the fuel cell stack, prior to the increased-anode-gas power generation step; and a re-determination step of re-determining whether or not the change amount remains in excess of the predetermined threshold value after the increased-cathode-gas power generation step, wherein:

if the determination step determines that the change amount has exceeded the predetermined threshold value, the increased-cathode-gas power generation step and the re-determination step are performed;

if the re-determination step determines that the change amount is equal to or less than the predetermined threshold value, the increased-cathode-gas power generation step is stopped and the continuous power generation step is performed; and if the re-determination step determines that the change amount remains in excess of the predetermined threshold value, the increased-anode-gas power generation step is performed.

2. The method of operating the fuel cell system according to claim 1, wherein:
after the increased-cathode-gas power generation step is performed for a predetermined period of time, the re-determination step is performed.

3. The method of operating the fuel cell system according to claim 1, wherein:
when performing the increased-anode-gas power generation step, the increased-cathode-gas power generation step is stopped.

4. The method of operating the fuel cell system according to claim 1, wherein:
in the increased-anode-gas power generation step, a valve opening period for one or more valves provided in a path through which anode off-gas discharged from the fuel cell stack flows is lengthened.

5. The method of operating the fuel cell system according to claim 1, wherein:
the increased-anode-gas power generation step continues until the voltage difference reaches the stable-period voltage difference.

6. The method of operating the fuel cell system according to claim 1, wherein:
by supplying a low-load anode gas amount and a low-load cathode gas amount, a low-load power generation that generates power lower than power generated in a normal power generation of the fuel cell stack is performed, the low-load anode gas amount being lower than the supply amount of the anode gas in the normal power generation, the low-load cathode gas amount being lower than a supply amount of the cathode gas in the normal power generation; and when the low-load power generation is performed, the stable-period voltage difference calculation step, the voltage difference calculation step, the determination step, the continuous power generation step, or the increased-anode-gas power generation step is performed.

* * * * *